Feb. 18, 1958 J. E. VISTAIN, JR., ET AL 2,823,639

TUNING INDICATOR

Filed May 6, 1955

INVENTORS:
James E. Vistain, Jr.
Wallace C. Johnson
BY J. D. Douglass
ATTORNEY 2,823,639

TUNING INDICATOR

James E. Vistain, Jr., Skokie, and Wallace C. Johnson, Lincolnwood, Ill., assignors to Admiral Corporation, Chicago, Ill., a corporation of Delaware Application May 6, 1955, Serial No. 506,543

4 Claims. (Cl. 116—124.4)

This invention relates to devices for indicating the station tuned in on a radio or television receiver and more particularly to an apparatus for indicating the particular channel.

As is well known to those versed in the art, television stations have certain portions of the radio spectrum assigned to them under which they may operate called channels. At the present time there are twelve channels on what is known as the very high frequency band and a considerably larger number of channels on what is known as the ultra high frequency band.

A television receiver usually includes a station selector portion called a tuner which in its most common form comprises a band selector, commonly called a turret turner, and a fine tuning control. Regardless of the type of the tuner involved it is most common to use a rotary shaft upon which a knob bearing indicia is moved opposite to an indicating line so that the person tuning the station will know to what channel he is tuned. Usually the fine tuning control is effected by a shaft in the form of a sleeve and the channel selector by a second shaft disposed in the first shaft and coaxial therewith.

It is most customary to provide the tuning controls so that they are most easily accessible at the front of the television cabinet in order that the person operating the controls can at the same time view the picture and determine if he desires that particular program. This has a disadvantage in that, although it is desirable to have the receiver operating in a well-lighted room, it is not desirable to have the face of the tube directly illuminated by room light. Therefore it is not convenient to view the indicia on the tuning controls because of the relatively poor light. Furthermore, it frequently happens that a person must bend downward to substantially the same level as the tuning knobs in order to determine the station being tuned.

By the present invention it is possible to view the station indicia from the front of the receiver without bending over or it can be viewed very clearly from directly above the receiver.

Another advantage resides in the fact that the indicia is illuminated in such a manner that they are more clearly visible in spite of the fact that they are not in the direct light of the room.

The invention is readily applicable to present type receivers, requiring no substantial change in the receiver itself but a slight modification of the cabinet.

Still other advantages of the invention and the invention itself will become more apparent from the following description of an embodiment thereof which description is illustrated by the accompanying drawings and forms a part of this specification.

In the drawings.

Throughout the drawings like parts have been designated by like reference characters.

Figures 1, 2, 3, 4, 5:
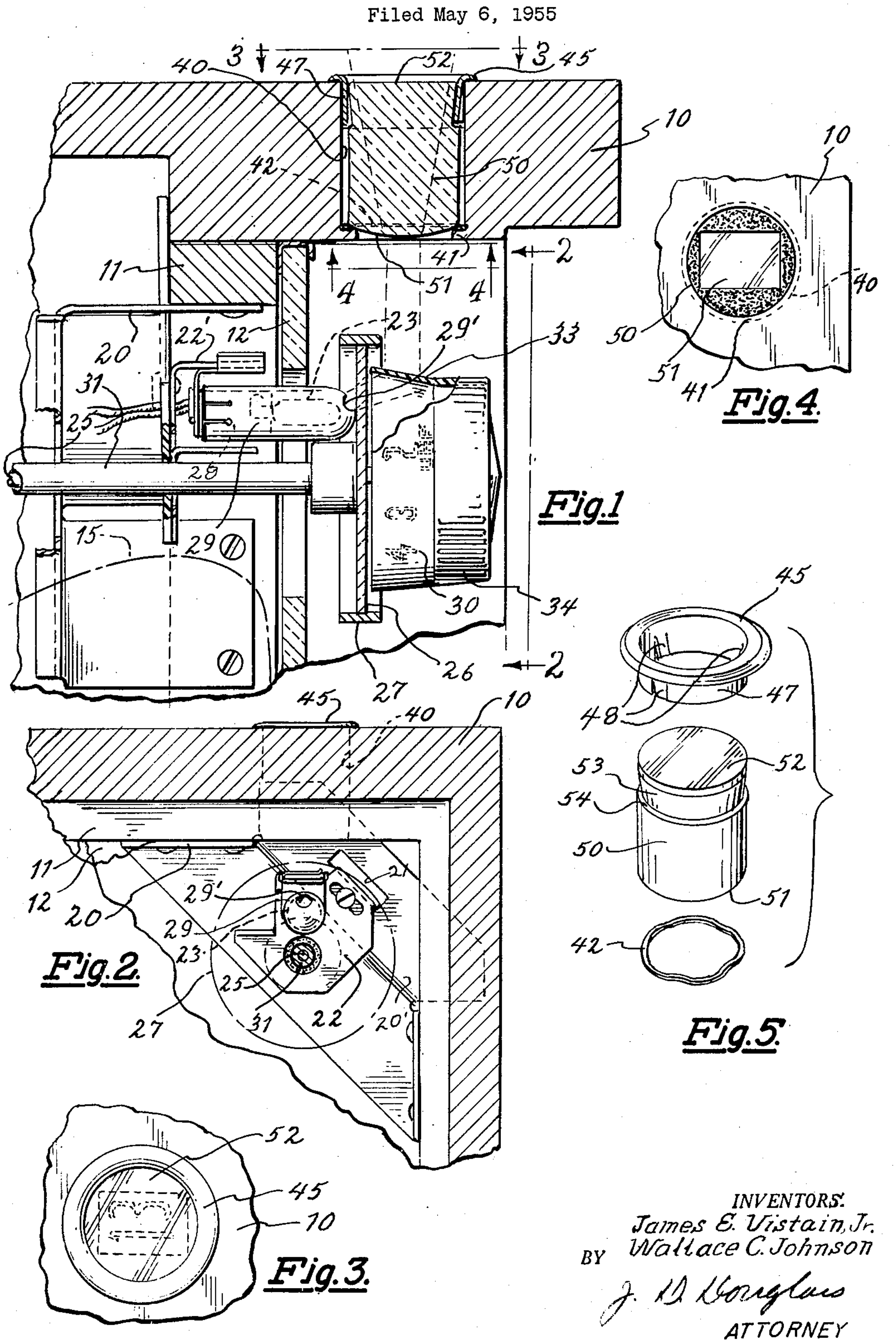
Fig. 1 is a fragmentary sectional view showing the top of a television cabinet and the tuning controls and the manner of their coordination for carrying out the invention.
Fig. 2 is a view taken on the line 2—2 of Fig. 1.
Fig. 3 is a top plan view of the viewing opening taken from the line 3—3 of Fig. 1.
Fig. 4 is a bottom plan view taken from the line 4—4 of Fig. 1.
Fig. 5 is an exploded perspective view of the escutcheon, lens and support ring.

Briefly the invention contemplates the use of a control knob for a channel selector, having a skirt or flange capable of transmitting light and bearing station identifying indicia. A light source is disposed to shine on the inside of the skirt whereby light is transmitted through the skirt but not through the indicia. The skirt is of generally conical formation such that it may be viewed from the front of the cabinet. The cabinet is provided with an opening in the top opposite to the skirt through which the indicia may be viewed from directly above the receiver. The opening may be provided with a lens system for magnifying the image view.

More specifically the cabinet may include a top 10 for the usual front opening through which the picture tube may be viewed and which is provided with a protective glass panel 12 supported by a frame 11 which carries a metal panel that engages the edge of the glass.

The television chassis, not shown, is provided with the usual tuner well known in the art and which comprises a station selector operated by a shaft 25 and a fine tuning control comprising a shaft or sleeve 31 disposed over the shaft 25.

It is most common for the shaft 25 to extend beyond the sleeve 31 and bear a knob, while the sleeve 31 bears a slightly larger knob rearwardly of the first mentioned knob and coaxially therewith for the fine tuning control. In this instance the fine tuning control knob includes a hub which is slipped on the end of the sleeve 31 the hub and sleeve being provided with flats or tongues and notches in a manner well known in the art. The hub is provided with a web of circular formation 26 made of a transparent or highly translucent material. The boundaries of the web 25 connect to a ring 27 which is preferably opaque. The ring 27 may be grasped by the fingers for turning the shaft 31. The channel selector knob for the shaft 25 is provided with a similar hub, not shown, for engagement with a shaft in a manner well known in the art. The outer end of the knob is provided with a corrugated finger gripping portion 34 which merges with a skirt 33 that flares outwardly as a frustrum of a cone.

Preferably the finger gripping portion 34 is either made of an opaque plastic or coated with an opaque coating on the inner surface. The skirt is provided with opaque numerals 30 which indicate the channels, the surrounding portion being either transparent or translucent. Preferably it is translucent.

The window has provided a circular opening through which the control shafts extend. Rearwardly of the window the frame 11, and at the corner of the cabinet, is provided with an angle bracket 20 secured to the frame 11 by screws and which has a hole coaxial with the hole in the window through which the shafts extend. The angle bracket 20 is provided with a shelf 20' having an opening 21. A dial light and shaft support bracket 22, best shown in Fig. 2, is seated on the shelf 20' having a lug which extends through the opening 21 and is secured in place by a screw through a slot in the bracket 22 which screw threads into the shelf 20' and holds the bracket securely in place.

The bracket 22 has a hole through it coaxial with the holes in the main bracket and window and opposite the hole a piece of fiber or Bakelite is secured having an opening therein and which serves as a bearing for the shaft 31. The bracket 22 is also provided with a forwardly extending arm 22' which provides a support for a dial light socket 28 in which a dial light 23 is disposed. A shield 29 is provided, being of an opaque material having a window 29' in the forward end.

As can best be seen from Fig. 1 the dial light is supported parallel to the shafts 25—31 with the window opening 29' closely adjacent to the transparent disk 26 so that the rays of light from the dial light may shine therethrough, as indicated by the dashed lines, upon the inner surface of the skirt 33. It will be appreciated that the light rays pass freely through the web 26 but do not pass through the indicia 30 at all, but illuminate the skirt 33 sufficiently to provide a good contrast. By positioning the dial light as shown the restricting portion of the knob is illuminated and thus only the single numeral indicating the channel is clearly visible.

A second bracket portion similar to the arm 22' is provided at substantially 90° from the one just described in order that the dial light may be moved 90° for different types of installations.

It will be appreciated that the angle of the skirt 33 may be varied from that shown in the drawings. However, the angle shown allows the skirt to be viewed, so that the indicia thereon can be readily read from the front of the cabinet in spite of the fact that the front of the cabinet is provided with an overhang, as illustrated, which is for the purpose of television sets having doors thereon.

Means is provided for viewing the indicia or tuning knob from directly above the cabinet. The cabinet is provided with a cylindrical opening 40 extending completely through the top of the cabinet. The bottom of the opening is provided with an inwardly extending circumferentiated flange 41 which provides an upwardly facing shoulder. The flange 41 provides a seat for a corrugated ring 42 (Fig. 5).

The top of the opening is closed by a circular escutcheon having a curved flange 45 which engages with the top of the cabinet and is provided with a substantially tubular body 47 which is designed to be forceably inserted in the hole 40 and provide a pressed fit therein so that it will not accidentally fall out. The skirt is provided with inwardly projecting tongues 48 from the body of the skirt. The lens preferably is a plano-convex lens, can be made of plastic or glass and comprises a cylindrical body 50 of slightly less diameter than the opening 40. The bottom surface 51 provides the convex portion. Adjacent the top the body is undercut at 53 to provide an upwardly facing shoulder 54, the top being the planar surface 52. With a ring 42 supported on the shoulder 41 and the escutcheon in place the lens may be forced downwardly through the ring until the tongues snap into the undercut portion 53 and the ends engage the shoulder 54. At this time the ring has the corrugations slightly flattened out and the tongues 48 engage with the shoulder 54 holding the assembly tightly in place and against rattling. As best shown in Fig. 4, the convex surface is provided with a coating of opaque material which defines a rectangular opening through which the numeral on the knob may be viewed.

It will be appreciated that the lens system need not necessarily be a solid member but could be hollow or could be two separate glass elements. In some instances it may be desirable in the interest of economy to even omit the lens system and allow the images to be viewed directly through the opening without advantages of magnification. It will be apparent however that with magnification the channel indicia may be more easily viewed.

It will be appreciated that the light source could also be supported in other manners than that shown and that the illustration is for the purpose of clarification of the invention rather than limitation.

Numerous and extensive departures can be made from the invention by those versed in the art without departing from the spirit or scope of the invention as defined in the appended claims.

We claim:

1. A television tuner station indicator wherein a television cabinet houses a chassis having a television tuner which is provided with a control shaft having a control knob thereon, said knob being disposed adjacent to the top forward edge of the cabinet and being formed with a translucent skirt having station identifying indicia thereon, a light source supported within the cabinet and directing light onto said skirt to illuminate the skirt around the indicia, the top of said cabinet being formed with an opening through the cabinet opposite to the skirt of said knob and magnifier means disposed in the opening through which a magnified view of the indicia on the knob may be viewed.

2. A device as described in claim 1 wherein a magnifier is disposed in the opening to enable a magnified view of the indicia to be seen through the opening.

3. A device as described in claim 2 wherein a rectangular mask is provided for the magnifier to restrict the field of view and the skirt of the knob slants outward obliquely.

4. A device as described in claim 3 wherein the opening is provided with a shoulder near the bottom, and spring means is supported on said shoulder and said magnifying means rests on said spring, escutcheon means for the top of the opening, said magnifying means having an undercut portion to provide a shoulder and spring tongue means on said escutcheon for extension into said undercut portion and engageable with said shoulder for holding the lens pressed against said spring.

References Cited in the file of this patent

UNITED STATES PATENTS

| | | |
|---|---|---|
| 2,117,441 | McWeeny | May 17, 1938 |
| 2,619,932 | Brewster | Dec. 2, 1952 |
| 2,681,634 | Palley | June 22, 1954 |
| 2,738,758 | Cutler et al. | Mar. 20, 1956 |